US011149638B2

United States Patent
Owen

(10) Patent No.: US 11,149,638 B2
(45) Date of Patent: Oct. 19, 2021

(54) PARTICLE SEPARATOR

(71) Applicant: Rolls-Royce Corporation, Indianapolis, IN (US)

(72) Inventor: Philip R. Owen, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 134 days.

(21) Appl. No.: 16/390,753

(22) Filed: Apr. 22, 2019

(65) Prior Publication Data

US 2020/0332711 A1 Oct. 22, 2020

(51) Int. Cl.
*F02C 7/052* (2006.01)
*B64D 33/02* (2006.01)

(52) U.S. Cl.
CPC ............ *F02C 7/052* (2013.01); *B64D 33/02* (2013.01); *B64D 2033/0246* (2013.01); *F05B 2260/63* (2013.01); *F05D 2220/32* (2013.01); *F05D 2260/607* (2013.01)

(58) Field of Classification Search
CPC . F02C 7/05; F02C 7/052; F02C 7/057; B64D 33/02; B64D 2033/0246; F05B 2260/63; F05D 2260/607
See application file for complete search history.

(56) References Cited

U.S. PATENT DOCUMENTS

| 3,979,903 | A | * | 9/1976 | Hull, Jr. | F02C 7/05 60/39.092 |
|---|---|---|---|---|---|
| 5,448,881 | A | * | 9/1995 | Patterson | F02C 7/057 60/794 |
| 6,702,873 | B2 | | 3/2004 | Hartman | |
| 7,296,395 | B1 | | 11/2007 | Hartman et al. | |
| 7,802,433 | B2 | | 9/2010 | Higgins | |
| 7,927,408 | B2 | * | 4/2011 | Sheoran | B01D 45/04 96/397 |
| 8,256,277 | B2 | | 9/2012 | Khibnik et al. | |
| 8,424,279 | B2 | | 4/2013 | Rajamani et al. | |
| 10,100,734 | B2 | | 10/2018 | Sheoran et al. | |
| 2008/0047425 | A1 | | 2/2008 | Loda et al. | |
| 2012/0131900 | A1 | | 5/2012 | Kenyon et al. | |
| 2016/0265435 | A1 | | 9/2016 | Snyder | |
| 2016/0363051 | A1 | * | 12/2016 | Snyder | F02C 7/052 |
| 2018/0058323 | A1 | | 3/2018 | Smith, III et al. | |
| 2018/0149092 | A1 | | 5/2018 | Zeller et al. | |
| 2019/0024587 | A1 | | 1/2019 | Smith, III et al. | |

* cited by examiner

*Primary Examiner* — Steven M Sutherland
*Assistant Examiner* — Thuyhang N Nguyen
(74) *Attorney, Agent, or Firm* — Barnes & Thornburg LLP

(57) ABSTRACT

An air-inlet duct includes an outer wall, an inner wall, and a splitter. The splitter cooperates with the outer wall and the inner wall to establish a particle separator which separates particles entrained in an inlet flow moving through the air-inlet duct to provide a clean flow of air to a compressor section of a gas turbine engine.

18 Claims, 3 Drawing Sheets

PARTICLE SEPARATOR

FIELD OF THE DISCLOSURE

The present disclosure relates generally to gas turbine engines, and more specifically to particle separators included in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Air is drawn into the engine through an air inlet and communicated to the compressor via an air-inlet duct. In some operating conditions, particles may be entrained in the air such as dust, sand, or liquid water and may be drawn into the air inlet and passed through the air-inlet duct to the compressor. Such particles may impact components of the compressor and turbine causing wear. This wear may decrease power output of the engine, shorten the life span of the engine, and lead to increased maintenance costs and increased down time of the engine.

One method of separating particles from air entering the compressor has been by inertial particle separation. Inertial particle separation uses the inertia of the particles to separate the particles from the air. As the air stream moves through the air-inlet duct, the air moves along a serpentine flow path and enters an engine channel of the air-inlet duct while the particles move along a generally linear travel path and enter a scavenge channel included in the air-inlet duct. In some instances, particles may enter the engine channel rather than the scavenge channel. Particles may deviate from the generally linear travel path due to separation of flow from an outer wall of the air-inlet duct leading to recirculation of the particles and/or other fluid flow phenomenon upstream of the scavenge channel.

SUMMARY

The present disclosure may comprise one or more of the following features and combinations thereof.

According to an aspect of the present disclosure, an air-inlet duct may include an outer wall arranged circumferentially about an engine rotation axis, an inner wall located radially between the outer wall and the engine rotation axis, a splitter located radially between the outer wall and the inner wall, and a bypass flow system. The inner wall and the outer wall may cooperate to define an air-inlet passageway adapted to receive a mixture of air and particles suspended in the air. The splitter may be configured to separate the mixture of air and particles into a clean flow substantially free of particles and a dirty flow containing the particles. The dirty flow may be located adjacent the outer wall and the clean flow may be located radially between the dirty flow and the inner wall. The outer wall may be formed to include a plurality of apertures arranged to extend radially through the outer wall. The bypass flow system may include a bypass duct arranged to receive a flow of bypass air through the plurality of apertures and a flow regulator located in the bypass duct. The flow regulator may be configured to control an amount of bypass air allowed to flow through the bypass duct.

In some embodiments, the splitter may include an outer splitter surface that cooperates with the outer wall to define a scavenge channel and an inner splitter surface that cooperates with the inner wall to define an engine channel. The splitter may be configured to direct the dirty flow into the scavenge channel and the clean flow into the engine channel.

In some embodiments, an outlet of the bypass duct may open into the scavenge channel and fluidly connect the bypass duct with the scavenge channel. In some embodiments, a blower may be configured to draw air through the bypass duct and the scavenge channel.

In some embodiments, the outer splitter surface and the inner splitter surface may form a splitter rim at an axially forward end of the splitter. The plurality of apertures may include apertures located axially forward of the splitter rim.

In some embodiments, the flow regulator may be a controllable valve. In some embodiments, the flow regulator may be a variable speed blower.

In some embodiments, the flow regulator may be configured to adjust the amount of bypass air flowing through the bypass duct to control a size of a region of separated flow in the air-inlet passageway adjacent to the plurality of apertures.

In some embodiments, the flow regulator may be selectively operated based on operating characteristics of the gas turbine engine. In some embodiments, one or more pressure sensors may be arranged to measure pressure within the air-inlet passageway. The flow regulator may be selectively operated based on the measurements of the one or more pressure sensors.

In some embodiments, the one or more pressure sensors may include at least two pressure sensors spaced apart from one another. The flow regulator may be selectively operated based on a comparison of the measurements of the at least two pressure sensors.

According to another aspect of the present disclosure, an air-inlet duct may include an engine core arranged along a central rotation axis and an air-inlet duct arranged to direct the flow of air into the engine core. The engine core may be configured to compress a flow of air, mix the compressed air with fuel, and ignite the air-fuel mixture to drive the gas turbine engine. The air-inlet duct may include an outer wall arranged circumferentially about the rotation axis, an inner wall located radially between the outer wall and the rotation axis, a splitter located radially between the outer wall and the inner wall, and a bypass flow system. The inner wall and the outer wall may cooperate to define an air-inlet passageway adapted to receive a mixture of air and particles suspended in the air. The splitter may include an outer splitter surface that cooperates with the outer wall to define a scavenge channel and an inner splitter surface that cooperates with the inner wall to define an engine channel. The splitter may be configured to separate the mixture of air and particles into a clean flow substantially free of particles and a dirty flow containing the particles. The dirty flow may be directed into the scavenge channel and the clean flow may be directed into the engine channel toward the engine core. The outer wall may be formed to include a plurality of apertures arranged to extend radially through the outer wall. The bypass flow system may include a bypass duct arranged to receive a flow of bypass air through the plurality of apertures and a flow regulator located in the bypass duct.

The flow regulator may be configured to control an amount of bypass air allowed to flow through the bypass duct.

In some embodiments, an outlet of the bypass duct may open into the scavenge channel and fluidly connect the bypass duct with the scavenge channel. In some embodiments, the flow regulator may comprise at least one of a controllable valve and a variable speed blower.

In some embodiments, the flow regulator may be configured to adjust the amount of bypass air flowing through the bypass duct to control a size of a region of separated flow in the air-inlet passageway adjacent to the plurality of apertures. In some embodiments, the flow regulator may be selectively operated based on operating characteristics of the gas turbine engine.

In some embodiments, one or more pressure sensors may be arranged to measure pressure within the air-inlet passageway. The flow regulator may be selectively operated based on the measurements of the one or more pressure sensors.

According to another aspect of the present disclosure, a method of removing particles from air moving through an air-inlet duct may include providing an inlet flow including particles to an air-inlet duct of a gas-turbine engine, separating the inlet flow into a dirty flow including substantially all the particles and a clean flow lacking substantially all the particles, directing the dirty flow to a scavenge chamber, directing the clean flow to a compressor included in the gas-turbine engine, and regulating a size of a separated flow region in the air-inlet duct.

In some embodiments, an outer wall of the air-inlet duct may be formed to include a plurality of apertures. Regulating a size of a separated flow region in the air-inlet duct may include controllably directing a flow of bypass air through the plurality of apertures. In some embodiments, the flow of bypass air may extend through a bypass duct having a flow regulator configured to control an amount of bypass air allowed to flow through the bypass duct.

These and other features of the present disclosure will become more apparent from the following description of the illustrative embodiments.

DETAILED DESCRIPTION OF THE DRAWINGS

Figure 1:
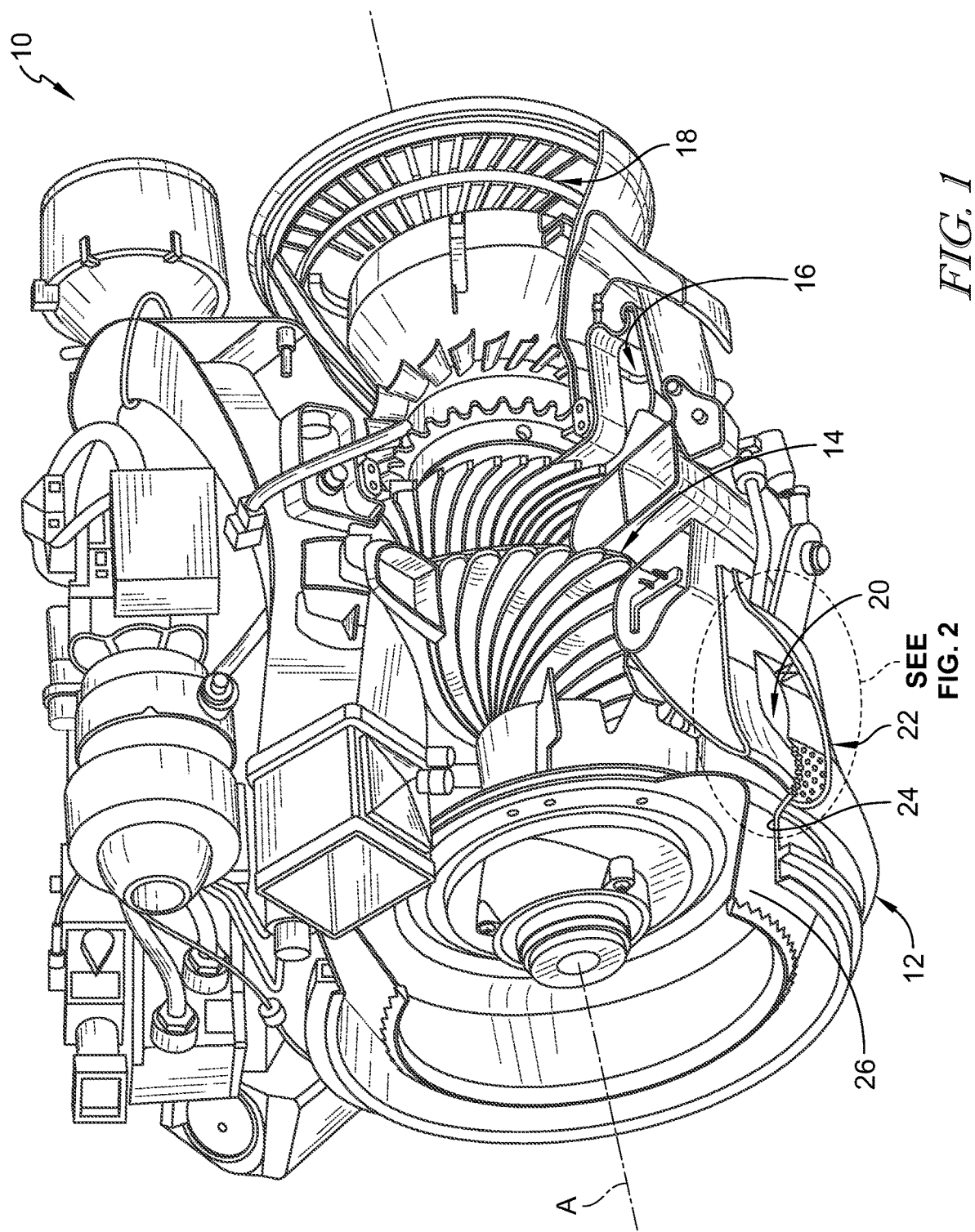
FIG. 1 is a cut-away perspective view of a gas turbine engine having an air-inlet duct in accordance with the present disclosure.

For the purposes of promoting an understanding of the principles of the disclosure, reference will now be made to a number of illustrative embodiments illustrated in the drawings and specific language will be used to describe the same.

A gas turbine engine 10 in accordance with the present disclosure is shown, for example, in FIG. 1. The gas turbine engine 10 includes an air-inlet duct 12, a compressor section 14, a combustor section 16, and a turbine section 18. The compressor section 14, combustor section 16, and turbine section 18 are sometimes referred together as an engine core. Air is drawn into the gas turbine engine through air-inlet duct 12 prior to admission of the air into the compressor section 14 as suggested in FIGS. 1 and 2. The compressor section 14 compresses air drawn into the engine 10 and delivers high-pressure air to the combustor section 16. The combustor section 16 is configured to ignite a mixture of the compressed air and fuel. Products of the combustion process are directed into the turbine section 18 where work is extracted to drive the compressor section 14 and a fan, propeller, output shaft, or gearbox.

In some environments, particles such as dirt, sand, or liquid water may be entrained in the air surrounding the engine 10 and carried into the gas turbine engine 10. The illustrative air-inlet duct 12 comprises a particle separator 20 configured to separate particles from the air to cause clean air substantially free from particles to be delivered to the compressor section 14 so that damage to the compressor section 14, combustor section 16, and turbine section 18 is minimized as suggested in FIGS. 1 and 2.

In some particle separators, natural phenomenon such as, for example, boundary layer separation may occur and can cause the airflow in the particle separator to become unsteady. Unsteady airflow may result in a slow-down of particles traveling through the air inlet duct and reduce the performance of a particle separator such that less particulate is removed from a flow of air directed into the compressor section of an engine.

Figure 2:
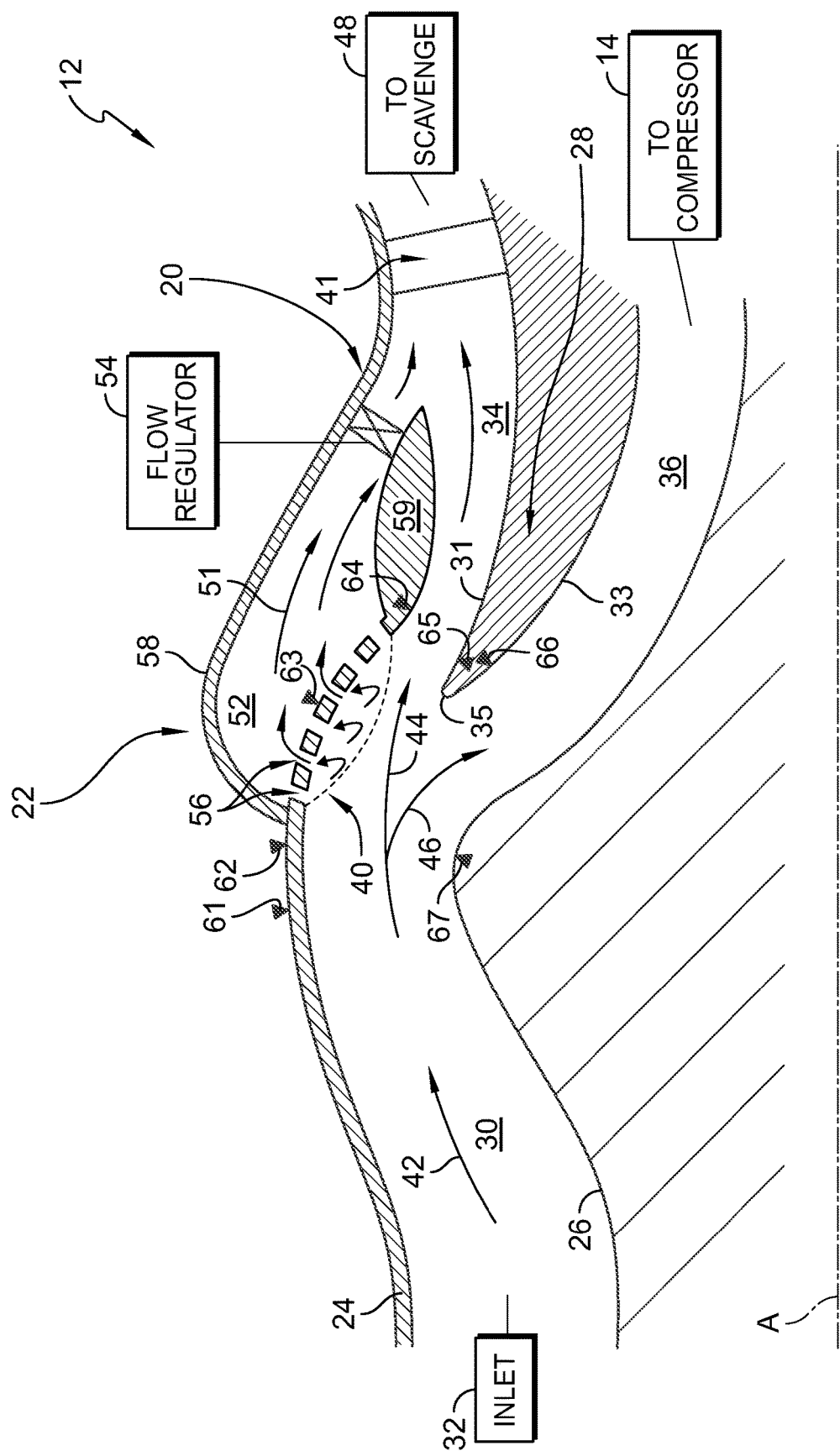
FIG. 2 is an enlarged partial view of the circled region of FIG. 1 showing that the air-inlet duct comprises a particle separator adapted to deliver clean air to a compressor of the engine and a bypass flow system to regulate a size of a separated flow region in the air-inlet duct.
Figure 3:
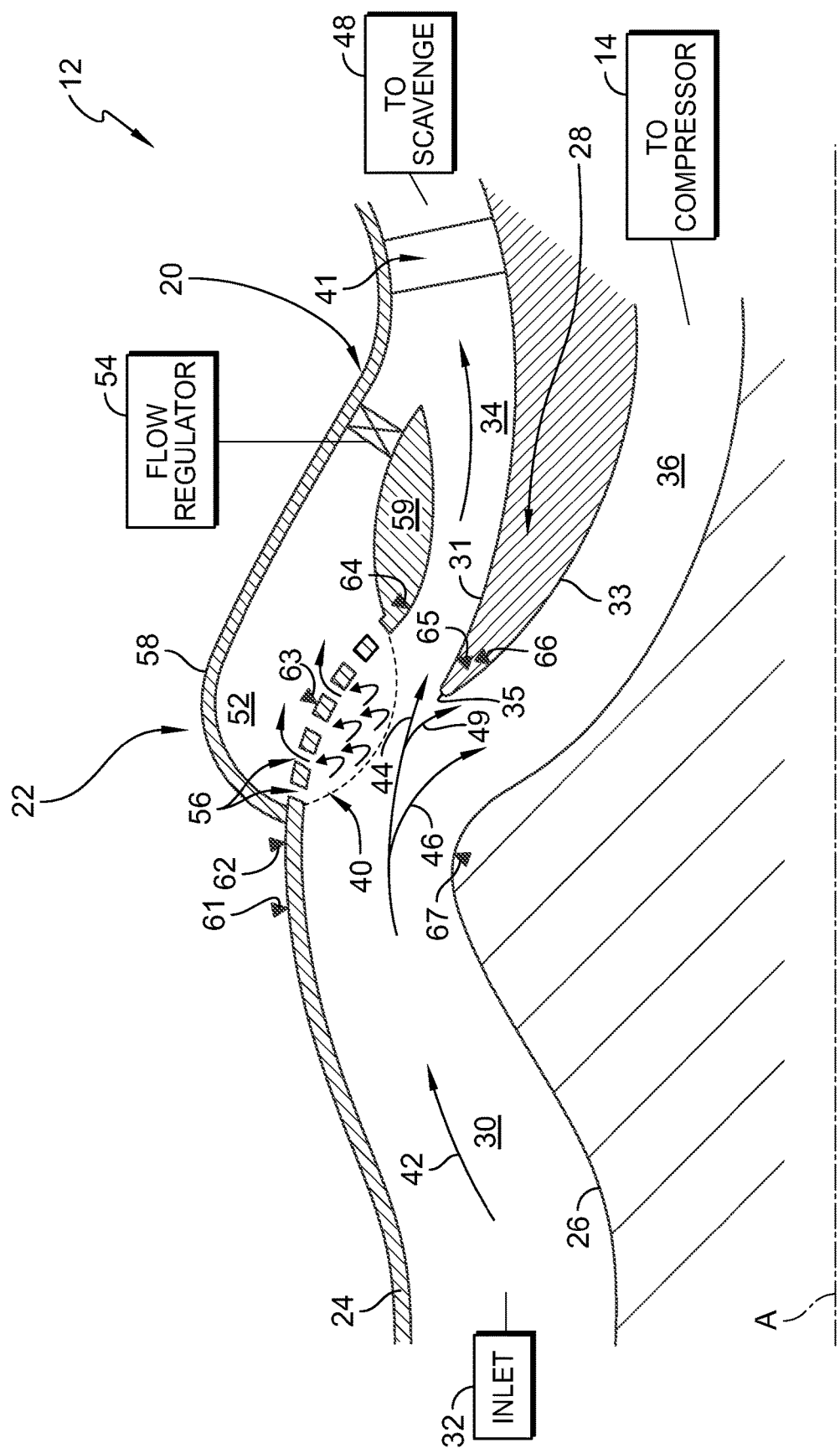
FIG. 3 is a view similar to FIG. 2 showing the separated flow region in the air-inlet duct enlarged causing particles from a dirty flow to pass to the compressor.

Embodiments in accordance with the present disclosure provide a bypass flow system 22 arranged to control a size of a region of separated flow 40 in the air-inlet duct 12 as suggested in FIGS. 2 and 3. In the illustrative embodiment, an outer wall 24 of the air-inlet duct 12 is formed to include a plurality of apertures 56 and the bypass flow system 22 selectively adjusts an amount of bypass air 51 that can flow through the apertures 56 to control the size of the region of separated flow 40. In some embodiments, the bypass flow system 22 is operated based on operating characteristics of the gas turbine engine 10. In some embodiments, one or more pressure sensors 61-67 measure pressure within the air-inlet duct 12 and the bypass flow system 22 is operated based on the measurements of the pressure sensors 61-67.

The illustrative air-inlet duct 12 includes the outer wall 24, an inner wall 26, and a splitter 28 as shown in FIG. 2. The outer wall 24 is annular and is located in spaced-apart relation to an engine rotation axis A. The inner wall 26 is also annular and is located radially between the outer wall 24 and the engine rotation axis A. The inner wall 26 and the outer wall 24 cooperate to define an air-inlet passageway 30 therebetween. The splitter 28 is located radially between the outer wall 24 and the inner wall 26. The splitter 28 illustratively cooperates with the outer wall 24 to establish the particle separator 20.

The illustrative air-inlet duct 12 comprises an inward turning inertial particle separator 20 as shown in FIG. 2. In other embodiments, the air-inlet duct 12 comprises an inward turning particle separator, outward turning particle separator, linear type particle separator, dual path type particle separator, multi-path particle separators, or any combination thereof. In some separators such as, for example, outward turning separators, the inner wall 26 or any other suitable surface may be formed to include the plurality of apertures 56 for controlling the size of regions of separated flow.

The splitter 28 includes an outer splitter surface 31 and an inner splitter surface 33 that define a splitter rim 35 at a forward end of the splitter 28 as shown in FIG. 2. The outer splitter surface 31 cooperates with the outer wall 24 to define a scavenge channel 34 therebetween. The scavenge channel 34 is configured to receive and direct a dirty flow 44 including a mixture of air and particles toward a scavenge area 48. In some embodiments, the scavenge area 48 is configured to direct the dirty flow 44 out of the engine 10 into the atmosphere. In other embodiments, the dirty flow 44 is directed elsewhere in the engine or nacelle, such as to a scavenge chamber. The inner splitter surface 33 cooperates with the inner wall 26 to define an engine channel 36 therebetween. The engine channel 36 is configured to direct the clean flow 46 of air into the compressor sections 14 of the gas turbine engine 10.

In use, the air-inlet duct 12 draws an inlet flow 42 through an inlet 32 and into the gas turbine engine 10 as suggested in FIG. 2. The inlet flow 42 includes air and particles entrained in the air. The particle separator 20 causes the clean flow 46 and the dirty flow 44 to be established as the inlet flow 42 moves through the air-inlet duct 12.

In some particle separators, a region of separated flow 40 forms in the inlet flow 42 as suggested in FIG. 2. The region of separated flow 40 may grow from the outer wall 24 toward the inner wall 26 in a region upstream of the splitter 28. In particular, the region of separated flow 40 may form upstream and adjacent an inlet of the scavenge channel 34. The apertures 56 may be formed in the outer wall 24 in locations where the region of separated flow 40 is likely to form.

The region of separated flow 40 may decrease the efficiency of particle separators as suggested in FIG. 3. For example, the region of separated flow 40 may block particles from entering the scavenge channel 34 and cause the blocked particles to enter the engine channel 36 in a flow 49. As another example, the region of separated flow 40 may draw particles out of the scavenge channel 34 and cause the particles to enter the engine channel 36. The region of separated flow 40 may have a greater effect on relatively fine particles (about 25 microns or smaller) and/or low mass particles than relatively large particles having greater momentum to pass through the region of separated flow 40 to the scavenge channel 34.

In the illustrative embodiment, the bypass flow system 22 includes a bypass duct 52 and a flow regulator 54 positioned in the bypass duct 52 as shown in FIGS. 2 and 3. The bypass duct 52 is defined between an outer extension 58 of the outer wall 24 and an inner extension 59 of the outer wall 24. The inner extension 59 is positioned radially outward of the splitter 28 and at least partially defines the scavenge channel 34. The outer extension 58 is positioned radially outward of the inner extension 59 and, in some embodiments, defines a downstream portion of the scavenge channel 34. In some embodiments, an outlet of the bypass duct 52 is fluidly connected to the scavenge channel 34 as shown in FIGS. 2 and 3. In some embodiments, the bypass flow 51 through the bypass duct 52 is directed to the atmosphere or other parts of the gas turbine engine 10.

In the illustrative embodiment, the plurality of apertures 56 are formed through the inner extension 59 into the bypass duct 52 as shown in FIGS. 2 and 3. The flow regulator 54 is positioned between the outer extension 58 and inner extension 59 to adjust an amount of bypass flow 51 that passes through bypass duct 52. In some embodiments, the flow regulator 54 includes one or more controllable valves that can open to varying degrees to adjust the amount of bypass flow 51. In some embodiments, the flow regulator 54 includes one or more variable speed blowers to adjust the amount of bypass flow 51. In some embodiments, the flow regulator 54 varies an opening size of the plurality of apertures 56 to adjust an amount of bypass flow 51 that can pass through the apertures 56 into the bypass duct 52. In the illustrative embodiment, a blower 41 is positioned in the scavenge channel 34 and configured to draw air through the scavenge channel 34 and bypass duct 52 (as allowed by the flow regulator 54).

In some embodiments, the scavenge channel 34 is formed as an annular particle collector, with the collected particles directed to one or more discrete outlets (such as a tube or conduit) circumferentially spaced around the axis A. In some embodiments, the blower 41 is positioned in an outlet of the scavenge channel 34. In some embodiments, the bypass duct 52 is formed as an annular cavity, with the bypass flow 51 extending from the apertures 56 to one or more discrete outlets (such as a tube or conduit) circumferentially spaced around the axis A. In some embodiments, the flow regulator 54 is positioned in an outlet of the bypass duct 52. In some embodiments, a blower is positioned to draw the bypass flow 51 through an outlet of the bypass duct 52. In some embodiments, an outlet of the bypass duct 52 is fluidly connected to the scavenge channel 34 and/or an outlet of the scavenge channel 34. In some embodiments, the bypass flow 51 remains separate and apart from the flow through the scavenge channel 34.

A size of the region of separated flow 40 can change depending on operating conditions of the gas turbine engine 10. For example, the region of separated flow 40 can increase or decrease depending on the temperature, pressure, density, humidity, amount of suspended particulate, and/or velocity of the inlet flow 42. The bypass flow system 22 operates to control the size of the region of separated flow 40 by adjusting the amount of bypass flow 51 as suggested in FIGS. 2 and 3. As such, the size of the region of separated flow 40 can be maintained or optimized for each stage of operation of the gas turbine engine 10. For example, in the context of an aircraft, the size of the region of separated flow 40 can be optimized for start-up, take-off, and cruise operating states of the gas turbine engine 10.

As shown in FIG. 2, the bypass flow system 22 allows a portion of the inlet flow 42 to pass through the apertures 56 into the bypass duct 52 as bypass flow 51 to adjust the size of the region of separated flow 40. As such, the particles suspended in the dirty flow 44 are free to flow into the scavenge channel 34. Under the same engine operating conditions, if no bypass flow 51 was allowed, as suggested in FIG. 3, the size of the region of separated flow 40 could be larger and cause particles to be directed to the engine channel 36 in the flow 49.

In some embodiments, the bypass flow system 22 operates to allow varying level of bypass flow 51 through bypass duct 52, including no bypass flow 51, in order to regulate the size of the region of separated flow 40. In some conditions, it may be beneficial to have some separated flow region 40 and the size of the flow region 40 may be optimized for specific conditions. In other conditions, it may be beneficial to eliminate the separated flow region 40.

In some embodiments, the plurality of apertures 56 are located axially forward of and/or adjacent the splitter 28 as shown in FIGS. 2 and 3. The location, number, and size of the apertures 56 can vary without departing from the present disclosure. In the illustrative embodiment, the apertures 56 are spaced apart circumferentially and axially from one another relative to the axis A.

In the illustrative embodiment, the apertures 56 are circular. In some embodiments, the apertures 56 are angled relative to the outer wall 24 to direct the flow of air through the apertures 56. The spacing between adjacent apertures 56 can be equal or varied across the plurality of apertures 56 without departing from the present disclosure. In some embodiments, the apertures 56 are formed into elongated slots. The elongated slots may be formed in the outer wall 24 and arranged to extend ahead of the region of separated flow 40, adjacent to the region of separated flow 40, and through the region of separated flow 40 and into the scavenge channel 34. The elongated slots may be arranged to extend axially along the outer wall 24, circumferentially along the outer wall 24, and/or diagonally (e.g., both axially and circumferentially) along the outer wall 24.

In some embodiments, the bypass flow system 22 is operated to adjust the amount of bypass flow 51 through the bypass duct 52 based on operating conditions of the gas turbine engine 10. For example, an open-loop control can be implemented by comparing one or more engine operating characteristics to a predetermined look-up table and operating the bypass flow system 22 based on the identified values from the look-up table. In some embodiments, the engine operating conditions can include flow temperatures, flow pressures, flow velocity, flow humidity, flow density, engine speed, speed of the blower 41, and vehicle speed, among others.

In some embodiments, the bypass flow system 22 is operated to adjust the amount of bypass flow 51 through the bypass duct 52 based on measured conditions of the gas turbine engine 10. In some embodiments, sensors 61-67 are coupled to air-inlet duct 12 to measure characteristics of the flows in the air-inlet duct 12. In some embodiments, the sensors 61-67 are configured to measure one or more of pressure, temperature, humidity, and flow velocity, among other characteristics.

A closed-loop control can be implemented by operating the bypass flow system 22 based on the measurements from the sensors 61-67. For example, the measured conditions can be correlated to a relative size of the region of separated flow 40 and the bypass flow system 22 can be operated to drive the measurements above/below threshold levels or within a range. In some embodiments, only one sensor is used to control operation of the bypass flow system 22 (e.g., sensor 61 or 62). In some embodiments, multiple sensors are used to control operation of the bypass flow system 22.

In some embodiments, a comparison of measured values from the sensors is used to control operation of the bypass flow system 22. For example, a measured pressure difference between sensors 62 and 61 can be used to determine the adverse pressure gradient in the vicinity of the potential region of separated flow 40.

In another example, a measured pressure difference between sensors 65 and 64 can be used to determine the flow restriction produced by the region of separated flow 40. In another example, a measured pressure difference between sensors 63 and 64 can be used to determine the size of the region of separated flow 40. In another example, a measured pressure difference between sensors 67 and 62 and/or 63 can be used to determine the degree of streamline curvature in the vicinity of the splitter rim 35. In another example, a measured pressure difference between sensors 65 and 66 can be used to determine the nature of the flow in the vicinity of the splitter rim 35. In another example, a measured pressure difference between sensors 67 and 64 can be used to determine the size of the region of separated flow 40, with a larger difference representing a larger size of the region of separated flow 40.

In some embodiments, the sensors 61-67 are static pressure taps. In some embodiments, the sensors 61-67 are dynamic sensors with a high frequency response (e.g., at least about 10 Hz) and resolution (e.g., readings down to about the $\frac{1}{100}$'s of PSI). The sensors 61-67 can be used to detect large, rapid swings in pressure indicative of a large region of separated flow 40.

In illustrative embodiments, the separation of particles from the inlet flow for applications such as turboshaft, turboprop, and turbofan gas turbine engines may be important to the life of the engine. Sand ingestion may cause erosion of compressor blades and may melt in the combustor and turbine components blocking cooling flow passages. Large sand particles (greater than 50 microns) may be separated well by inertial particle separators. However, fine particles (less than 25 microns) may be difficult to remove from the inlet flow.

In illustrative embodiments, a region of separated flow may develop in inlet particle separators. Such separated flow regions may be unsteady in nature and may contribute to the difficulties encountered removing both large and small particles. Controlling the size of the region of separated flow in a particle separator may enhance the overall particle separation efficiency of inertial particle separators.

In illustrative embodiments, active control of suction on the outer wall is used to control the size of the separated flow region. This provides benefits of allowing the flow surfaces to be shaped to more optimally separate particles and allowing separator performance to be optimized at each operating condition of the engine, among others.

In illustrative embodiments, flow entering the separator divides to produce two streams, one on either side of a splitter. Particulate in the flow is carried by the stream above the splitter to a blower that discharges it. This flow is called the scavenge flow. The flow stream radially inward of the splitter is intended to be relatively free of particulate, and enters the engine core. A region of separated flow may exist along the outer wall of the separator above and mostly forward of the splitter nose.

In illustrative embodiments, the outer wall is perforated in a region covering a portion or the entire surface under which separation occurs. Various shapes, number, or arrangement of perforations can be used. Suction is applied above the perforations in the outer wall to remove a controlled amount of fluid, together with any particulate that may pass through the outer wall holes. This suction may be provided by any means, such as using the same blower as provided for the scavenge flow.

In illustrative embodiments, a flow regulation device is used that can control the quantity of flow removed through the holes in the outer wall. The flow regulation device can be in the flow passage containing the flow removed by suction. A flow regulator can be positioned upstream of the blower and downstream of the location at which the scavenge flow and flow removed by suction join in addition or in alternative to the flow regulator in the bypass duct.

In illustrative embodiments, the flow regulation device is actively controlled. Controlling the flow regulation device controls the amount of flow removed by suction in such a way as to optimize the performance of the inertial particle separator (such as maximizing the separation efficiency for a given range of particle sizes). In some embodiments, optimization of separator performance results from controlling the size and shape of the region of separated flow, including the possibility of eliminating it altogether.

In illustrative embodiments, active control can be either open-loop or closed-loop. Open-loop control does not involve a feedback loop employing the measurements from sensors. Measurements such as flow temperatures and pressures at the inlet of the separator, engine speeds, and blower speed may be used by the control, but a fixed schedule of flow regulation device configuration is implemented as a function of such measurements. The fixed schedule would be determined from experimental measurements of a representative separator, and/or computational results from simulation of the separator.

In illustrative embodiments, closed-loop control involves using measurements from sensors, called feedback, and seeking to change the flow regulation device configuration until certain values of and/or relationships between the sensor measurements is obtained. A variety of sensor technology, arrangement of sensors, and control logic can be employed without departing from the present disclosure. An example involves using steady static pressure measurements from one or more locations inside the air-inlet duct. Examples of possible static pressure measurement locations include along the outer wall, on the inner surface, on the outer surface of the splitter, and on the inner surface of the splitter. Individual measurements, comparative measurements, relationships between measurements, and combinations thereof can be used in the active control.

In illustrative embodiments, dynamic instrumentation is used to deduce the level of unsteadiness in or near the region of potentially separated flow for active control.

In illustrative embodiments, the nature of measurements taken in the flow field that correspond to desirable separator performance can be determined experimentally and/or computationally at each operating condition. The operating condition may be defined using measurements other than those potentially used in the control of the flow regulation device, and might include pressures and temperatures at the inlet of the separator, pressures and temperatures at the inlet of the engine compressor, and rotational speeds of engine components. The results of these physical and/or computational experiments can be used to determine if open-loop or closed-loop control is more appropriate, and in either case the nature of the control logic.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An air-inlet duct for use with a gas turbine engine, the air-inlet duct comprising
   an outer wall arranged circumferentially about an engine rotation axis, the outer wall formed to include a plurality of apertures arranged to extend radially through the outer wall,
   an inner wall located radially between the outer wall and the engine rotation axis, the inner wall and the outer wall cooperate to define an air-inlet passageway adapted to receive a mixture of air and particles suspended in the air,
   a splitter located radially between the outer wall and the inner wall and configured to separate the mixture of air and particles into a clean flow substantially free of particles and a dirty flow containing the particles, the dirty flow located adjacent the outer wall and the clean flow located radially between the dirty flow and the inner wall, and
   a bypass flow system having a bypass duct arranged to receive a flow of bypass air through the plurality of apertures and a flow regulator located in the bypass duct,
   wherein the splitter includes an outer splitter surface that cooperates with the outer wall to define a scavenge channel and an inner splitter surface that cooperates with the inner wall to define an engine channel and the splitter is configured to direct the dirty flow into the scavenge channel and the clean flow into the engine channel,
   wherein the bypass duct is defined between an outer extension of the outer wall located radially outward of the outer wall and an inner extension of the outer wall located radially inward of the outer extension and radially outward of the splitter to define a portion of the scavenge channel, the flow regulator is positioned between the outer extension and the inner extension, and
   wherein the flow regulator is configured to adjust an amount of bypass air allowed to flow through the bypass duct to control a size of a region of separated flow in the air-inlet passageway adjacent to the plurality of apertures.

2. The air-inlet duct of claim 1, wherein an outlet of the bypass duct opens into the scavenge channel and fluidly connects the bypass duct with the scavenge channel.

3. The air-inlet duct of claim 2, further comprising a blower configured to draw air through the bypass duct and the scavenge channel.

4. The air-inlet duct of claim 1, wherein the outer splitter surface and the inner splitter surface form a splitter rim at an axially forward end of the splitter and the plurality of apertures include apertures located axially forward of the splitter rim.

5. The air-inlet duct of claim 1, wherein the flow regulator is a controllable valve.

6. The air-inlet duct of claim 1, wherein the flow regulator is a variable speed blower.

7. The air-inlet duct of claim 1, wherein the flow regulator is selectively operated based on operating characteristics of the gas turbine engine.

8. The air-inlet duct of claim 1, further comprising one or more pressure sensors arranged to measure pressure within the air-inlet passageway, and wherein the flow regulator is selectively operated based on the measurements of the one or more pressure sensors.

9. The air-inlet duct of claim 8, wherein the one or more pressure sensors includes at least two pressure sensors spaced apart from one another, and wherein the flow regulator is selectively operated based on a comparison of the measurements of the at least two pressure sensors.

10. The air-inlet duct of claim 8, wherein the one or more pressure sensors includes a first pressure sensor located axially aft of the plurality of apertures in the bypass duct and a second pressure sensor located on the inner extension of the outer wall, and wherein the flow regulator is selectively operated based a measured pressure different between the first sensor and the second sensor.

11. The air-inlet duct of claim 8, wherein the one or more pressure sensors includes a first pressure sensor located on the splitter and a second pressure sensor located on the inner extension of the outer wall, and wherein the flow regulator is selectively operated based on a measured pressure different between the first sensor and the second sensor.

12. The air-inlet duct of claim 8, wherein the one or more pressure sensors includes a first pressure sensor located on the outer splitter surface and a second pressure sensor located the inner splitter surface, and wherein the flow regulator is selectively operated based on a measured pressure different between the first sensor and the second sensor.

13. A gas turbine engine comprising
an engine core arranged along a central rotation axis and configured to compress a flow of air to provide compressed air, mix the compressed air with fuel to provide an air-fuel mixture, and ignite the air-fuel mixture to drive the gas turbine engine, and
an air-inlet duct arranged to direct the flow of air into the engine core, the air-inlet duct comprising
an outer wall arranged circumferentially about the central rotation axis, the outer wall formed to include a plurality of apertures arranged to extend radially through the outer wall,
an inner wall located radially between the outer wall and the central rotation axis, the inner wall and the outer wall cooperate to define an air-inlet passageway adapted to receive a mixture of air and particles suspended in the air,
a splitter located radially between the outer wall and the inner wall and includes an outer splitter surface that cooperates with the outer wall to define a scavenge channel and an inner splitter surface that cooperates with the inner wall to define an engine channel, the splitter configured to separate the mixture of air and particles into a clean flow substantially free of particles and a dirty flow containing the particles, the dirty flow directed into the scavenge channel and the clean flow directed into the engine channel toward the engine core, and
a bypass flow system having a bypass duct arranged to receive a flow of bypass air through the plurality of apertures and a flow regulator located in the bypass duct,
wherein the bypass duct is defined between an outer extension of the outer wall located radially outward of the outer wall and an inner extension of the outer wall located radially inward of the outer extension and radially outward of the splitter to define a portion of the scavenge channel, the flow regulator is positioned between the outer extension and the inner extension, the flow regulator is configured to control an amount of bypass air allowed to flow through the bypass duct.

14. The air-inlet duct of claim 13, wherein an outlet of the bypass duct opens into the scavenge channel and fluidly connects the bypass duct with the scavenge channel.

15. The air-inlet duct of claim 13, wherein the flow regulator comprises at least one of a controllable valve and a variable speed blower.

16. The air-inlet duct of claim 13, wherein the flow regulator is configured to adjust the amount of bypass air flowing through the bypass duct to control a size of a region of separated flow in the air-inlet passageway adjacent to the plurality of apertures.

17. The air-inlet duct of claim 16, wherein the flow regulator is selectively operated based on operating characteristics of the gas turbine engine.

18. The air-inlet duct of claim 16, further comprising one or more pressure sensors arranged to measure pressure within the air-inlet passageway, and wherein the flow regulator is selectively operated based on the measurements of the one or more pressure sensors.

* * * * *